United States Patent [19]
Hawes

[11] Patent Number: 6,094,662
[45] Date of Patent: Jul. 25, 2000

[54] APPARATUS AND METHOD FOR LOADING AND RELOADING HTML PAGES HAVING CACHEABLE AND NON-CACHEABLE PORTIONS

[75] Inventor: Michael Kerrigan Hawes, Pittsford, N.Y.

[73] Assignee: Xerox Corporation, Stamford, Conn.

[21] Appl. No.: 09/069,819

[22] Filed: Apr. 30, 1998

[51] Int. Cl.[7] .................................................. G06F 7/00
[52] U.S. Cl. .......................................... 707/104; 709/218
[58] Field of Search ............................... 709/218; 707/104

[56] References Cited

U.S. PATENT DOCUMENTS

| | | | |
|---|---|---|---|
| 5,715,453 | 2/1998 | Stewart ................................... | 707/104 |
| 5,737,592 | 4/1998 | Nguyen et al. ......................... | 707/104 |
| 5,737,599 | 4/1998 | Rowe et al. ............................ | 707/104 |
| 5,793,966 | 8/1998 | Amstein et al. ........................ | 704/4 |
| 5,802,520 | 9/1998 | Jerkunica et al. ..................... | 707/101 |
| 5,894,554 | 4/1999 | Lowery et al. ........................ | 709/203 |
| 5,946,697 | 8/1999 | Shen ...................................... | 707/104 |

OTHER PUBLICATIONS

Xerox: CentreWare Internet Services, Docuprint, Nov. 2, 1997, 98 pgs.
"Official Netscape Navigator Gold 3.0 Book"—Alan Simpson ISBN 1–56604–420–0, Copyright 1996, 934 pgs.

*Primary Examiner*—Zarni Maung
*Assistant Examiner*—Yeshi Gebremeskel
*Attorney, Agent, or Firm*—Oliff & Berridge, PLC

[57] ABSTRACT

On an embedded device with a web server, pages are marked as having non-cacheable HTML portions and cacheable graphics portions. Marking the HTML portion as non-cacheable allows for the retrieval of a web page containing the latest status information without retrieving the graphics images. A refresh function is provided that allows for the comparing of non-cached portion time stamps with the stamps of the page on the web server. When the time stamp of the page on the web server is more current than the time stamp of the non-cached portion, the non-cacheable portion of the web page is retrieved from the web server. Retrieving the non-cacheable HTML portion from the web site without retrieving the cached portion reduces the amount of time needed to refresh the display image. A timer may be employed to refresh the web page at predetermined intervals, while using the current URL or the history list of the browser to reach the desired web site and retrieve the current status of the embedded device. The refresh function may be activated by a button available on the browser or by a refresh button on the web page.

4 Claims, 6 Drawing Sheets

APPARATUS AND METHOD FOR LOADING AND RELOADING HTML PAGES HAVING CACHEABLE AND NON-CACHEABLE PORTIONS

BACKGROUND OF THE INVENTION

1. Field of Invention

This invention relates generally to an apparatus and method for loading and reloading electronically transmitted documents. More particularly, this invention relates to an apparatus and method for loading web pages, such as HTML pages, where some portions are marked as non-cacheable and other portions are marked as cacheable.

2. Description of Related Art

The linking of desktop computers to other computers may be done using various networking techniques. For example, a local area network (LAN) typically uses a central computer known as a server, and multiple desktop computers connected to the server. In a LAN, the server contains information and programs which each desktop computer connected to the server can access and utilize.

Another way of sharing information among computers involves a network of computers known as the Internet and the World Wide Web (WWW). In the WWW, individual computers access information located on other computers. The information is accessed via an access image or page. Each page of information on the WWW has an address, known as a uniform resource locator (URL). Only the unique URL is needed in order to access the desired information on another computer through the Internet.

Restricting access to a limited number of computers in an Internet-type environment results in another form of networking known as an Intranet. Intranets represent a way for multiple computers to share information among only those computers. By preventing computers outside the intranet from accessing the information contained on the server, security is improved.

Each page accessible via an intranet or the Internet is generated using an editing language. One document editing language is the hypertext mark-up language (HTML). HTML allows for the embedding of images, sounds, video streams, form fields and simple text formatting into a page. References to other pages or locations may also be embedded in the page using the URLs of the desired page or location.

Additionally, special programming languages, such as Java®, have been developed to allow for rapid transfer of information among computers on both intranets and the Internet. Java® is an object-oriented programming language which can run on any computer platform (i.e., operating system), allowing different computers having different computer platforms to communicate. For example, these different platforms include Macintosh®, Windows 95®, Windows NT® and UNIX.

When a user desires to communicate on the Internet or on an intranet, a browser is generally required. A browser is a computer program which enables a user to look at information on other computers and retrieve information from other computers in an environment that allows for cross-platform communications. Examples of browsers include Netscape Navigator®, MS Internet Explorer® and Hot Java®. Many browsers are written in Java to allow for easy cross-platform transfer of information. When the browser accesses a URL, a page of information in HTML is copied and transferred across the network into the user's computer. The information contained in the page is generally stored in a cache in local memory. The user can scroll, or otherwise navigate, within the retrieved page. When the user is finished with that particular page, another URL may be selected and accessed and another page retrieved. Should the user desire to go back to a previously accessed page, that page, if still maintained in the cache, is simply brought back to the user's view. If the user desires to determine if the current page available over the network contains updated information compared to the previously retrieved page stored in the cache, the URL may be re-accessed and the entire page retransmitted, redisplayed and re-cached, i.e., reloaded.

SUMMARY OF THE INVENTION

When the user reloads a previously retrieved page, the entire page is retransmitted, even if only a portion of the page was updated. That is, portions of the current page on the network that are identical to the corresponding portions of the previously retrieved page, are transmitted to the requesting user, even though there is no need to transmit such portions.

This invention provides an apparatus and method for loading a web page onto a computer and separating the non-cacheable portions that are likely to change often from the cacheable portions that are likely to change infrequently, if at all. A web page typically consists of an HTML document and a number of images. The HTML document contains the text portion of the page as well as the position of each image.

This invention further provides an apparatus and method that allows a browser to obtain the current status of a web page at regular intervals, and download only the portions that were changed from the previously retrieved page while the unchanged portions that are cached in a local memory are retrieved from the local memory.

Additionally, a timed wait can be selected, at which time the apparatus of this invention jumps to the URL of a currently retrieved page to determine if that page has been updated at the URL site. Alternatively, on completion of the timed wait, the apparatus of this invention backs up using the browser history list to determine if a page has been updated by comparing the cached contents for that page to the desired page at the URL site.

When a timed reload of an web page is desired, the current URL or a URL contained in a browsers'history list is used, enabling the current status of what is being monitored to be displayed more efficiently. For example, if the user desires the current status of an embedded device, such as a printer, the timed reload may be used so that the user does not have to re-enter the URL manually at predetermined intervals.

In particular, for many web pages, HTML portions of the page are likely to change often, while the images used on the page are likely to change infrequently, if at all. Moreover, the HTML portions comprise only a minor portion of the data to be retrieved from the URL site, while the image portions comprise a major portion of the data to be retrieved. Marking portions of the page as non-cacheable and other portions as cacheable allows for refreshing of the page without incurring the loading and delay problems associated with traditional methods of transferring web-related information. Thus, the page can be reloaded without transferring large graphics images if those graphics images have not changed from the graphics images stored in the browser's cache. Therefore, if the image portions of the re-loaded page do not have to be re-transmitted, because they have not changed, the amount of data to be re-transmitted is significantly reduced.

These and other features and advantages of this invention are described in or are apparent from the following detained description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
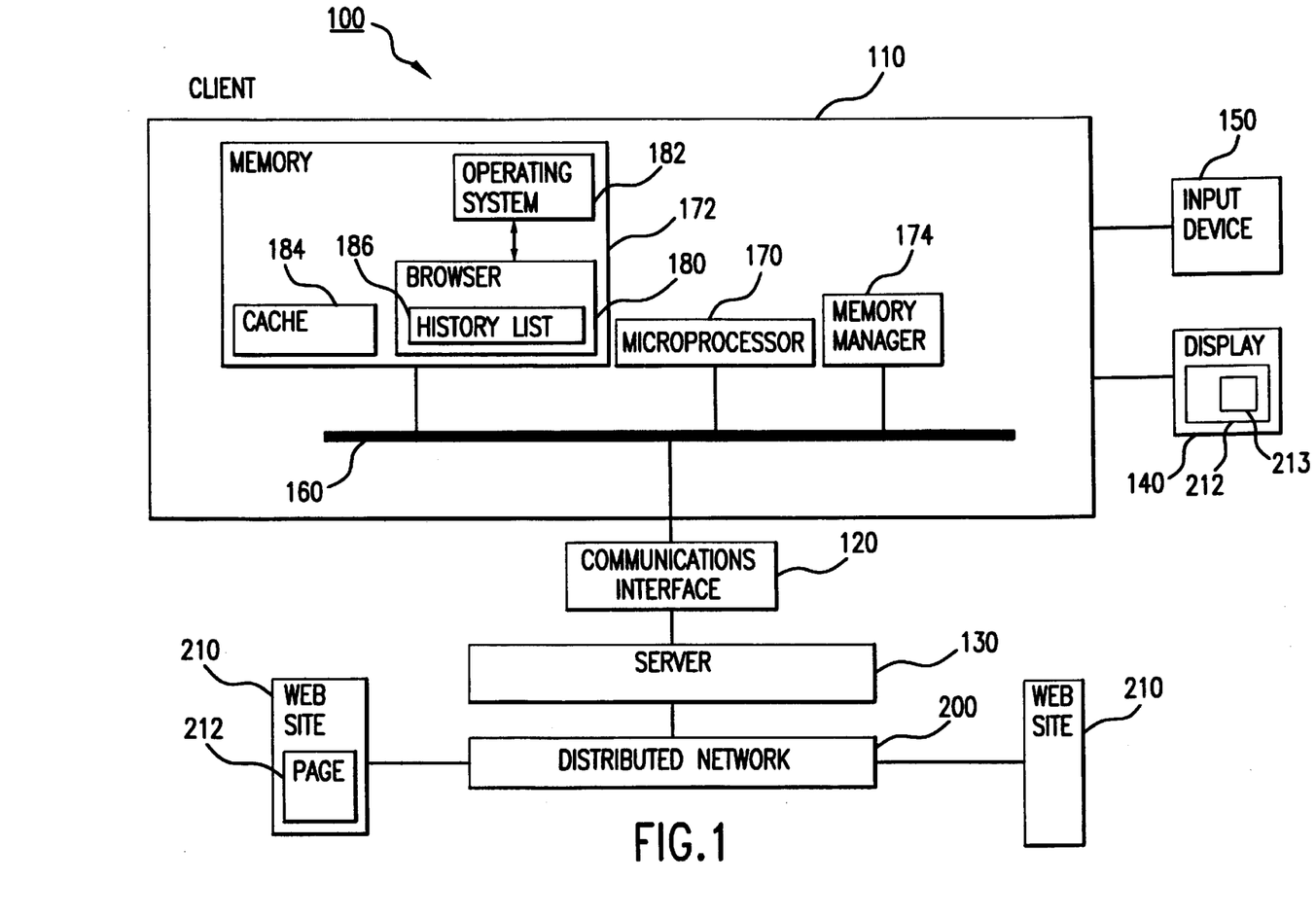
FIG. 1 is a block diagram of a system for accessing web pages.

FIG. 1 is a block diagram of a system 100 for access and loading pages retrieved from a remote block of a distributed network 200, such as an intranet or the Internet. The system 100 includes a client 110 and a communications interface 120 connected to a server 130. The client 110 may be a Windows 95®, Windows NT®, Macintosh® or UNIX platform computer, or any other programmed general purpose computer. The communications interface 120 is used to establish a communications link between the client 110 and the server 130. The communications interface may be any device that allows communication signals to pass between the client 110 and the server 130. The communications interface 120 may be a network card, a dial-up modem, or any other type of communications interconnector.

The server 130 may also be implemented on a programmed general purpose computer, and can also be implemented on a special purpose computer, a programmed microprocessor or microcontroller and peripheral integrated circuit elements, and ASIC or other integrated circuit, a digital signal processor, a hard wired electronic or logic circuit such as a discreet element circuit, a programmable logic device such as a PLD, PLA, FPGA or PAL, or the like.

The client 110 is also connected to a display device 140. The display device 140 may be a CRT monitor, an LCD monitor, a projector and screen, a printer, or any other device that allows a user to visually observe images.

The client 110 is also connected to an input device 150. The input device 150 may be one or more of a keyboard, a pointing device, an audio receiver, or any other device that allows a user to input information to the client 110.

The client 110 contains a bus 160 connecting a processor 170, a memory 172 and a memory manager 174.

As shown in FIG. 1, the memory 172 is preferably implemented using static or dynamic RAM. However, the memory 172 can also be implemented using one or more of static RAM, dynamic RAM, ROM, flash memory, hard disk drive, CD-ROM drive, Floppy Disk Drive, Network Servers or the like. The memory manager 174 is generally a program for determining how best to allocate information in the memory 172. Caches may be created in the memory 172, resulting in a cache portion 184. A cache is a portion of memory in a computer used for the rapid access of information, and is also known as a fast storage buffer. The memory manager 174 determines routing of information between different memory types. For example, the memory manager 174 is used to determine which information is routed to the cache 184, or the hard disk or other memory storage device. The cache portion 184 of memory 172 is normally faster than an uncached portion of memory. For example, RAM may be used as cache to the uncached hard disk. In the browser of this invention, the hard disk is used to cache the information available on the Web.

As shown in FIG. 1, the processor 170 is preferably implemented on a programmed general purpose computer. However, the processor 170 can also be implemented on a special purpose computer, a programmed microprocessor or microcontroller and peripheral integrated circuit elements, and ASIC or other integrated circuit, a digital signal processor, a hard wired electronic or logic circuit such as a discreet element circuit, a programmable logic device such as a PLD, PLA, FPGA or PAL, or the like. In general, any device, capable of implementing a finite state machine that is in turn capable of implementing the flow charts shown in FIGS. 3–5, can be used to implement a processor 170.

The memory 172 stores a browser 180 and an operating system 182. The operating system 182 can be any computer operating system known in the art, including DOS®, OS/2® and WINDOWS®. The browser 180 can be any browser capable of retrieving information from another node of the distributed network 200.

The browser 180 may be any network or Web browser. For example, the browser 180 may be any commercially available browser such as Netscape Navigator®, Microsoft Internet Explorer®, or Hot Java®. The browser 180 is used to retrieve pages from the nodes, or web sites, 210, for display on the display device 140. A user inputs a URL and the browser 180, through the modem 120 and the server 130, accesses the network 200. The network 200 may be part of a local area network, the Internet or an intranet, or the like.

The browser 180 typically maintains a record of the URLs visited by the user in a history list 186. The history list 186 is stored in the memory 172, and is limited in size, for example, by the amount of memory allocated by the memory manager 174.

When the browser 180 retrieves a page 212 from a web site 210, the information is transferred to the client memory 172. The page 212 may contain both text and graphics information. The graphics information may be in the form of GIFs, bitmaps, or other stored image information formats. The browser 180 separates the web page 212 into cacheable portions to be stored in the cache portion 184 of the memory 172 and non-cacheable portions to be stored in other, non-cache, portions of the memory 172.

In general, the cacheable portions of the retrieved page will be those portions that are expected to change infrequently, if at all. In contrast, in general, the non-cacheable portions of the retrieved page will be those portions that are expected to change frequently. In the current embodiment of the Internet, there is no widely used mechanism for distinguishing the infrequently-changed portions of a page from the frequently-changed portions of that page. In the absence of such a mechanism, according to this invention, any HTML portions of the retrieved page are assumed to be frequently-changed portions, while any non-HTML portions, and especially the image portions, are assumed to be infrequently changed portions. Thus, according to this invention, the cacheable portions of the retrieved page are the non-HTML portions, while the non-cacheable portions of the retrieved page are the HTML portions.

It should be appreciated that, if a mechanism for identifying a portion of a page as cacheable or non-cacheable is used by the creator of the page, the system and method of this invention will preferably use such designations of the various portions of that retrieved page in place of the above-outlined default designations.

Thus, in the general case, the non-HTML portions, such as GIFs, or bitmaps or other image portions are stored as cacheable information. The HTML portions of the web page 210 are stored as non-cacheable information.

Web pages are generally updated at the web site 210 without the client 110 being aware of such updates. Using the browser 180, a user can request refreshing of the web page using the browser graphical user interface. In the preferred embodiment, the browser 180 accesses the web page URL, and compares the non-cached portion with the corresponding portion of the web page 212. If a change is detected, the browser 180 requests the non-cacheable portion of the web page 212 to be downloaded to the client 110 and displayed on display 140. While retrieving the non-cacheable portion of the web page 212 from the web site 210, the browser retrieves the cached portion of the web page 212 from cache 184 for displaying on display 140. The web page 212 typically contains time status information, indicating when the web page 212 was last updated. To check if the non-cached portion of the web page 212 was updated since it was last downloaded to the client 110, the browser 180 may compare the time status information of the non-cached portion and the time status information of web page 212 at web site 210. If the time status information of the web page 212 at the web site 210 is more recent than the time status information of the un-cached portion at the client, the non-cacheable portion of the web page 212 is retransmitted to the client 110.

In another embodiment of this invention, the browser 180 contains a timer that can be set by a user to periodically determine if a predetermined web page at web site 210 has been updated. When the timer times out, the browser accesses the web site 210 of the desired page and compares the non-cacheable portion of the web page to the non-cache portion of the web page previously downloaded to the client in order to determine if there is newer information.

In yet another embodiment, the web page 212, when displayed on the display 140, contains a reload button or a refresh status button 213. The user selects, or clicks, the refresh status button 213 to determine if one or more non-cached portions of the desired web page have changed since the page was last downloaded to the users computer. The reload status or the refresh status button 213 requests the retransmission of the non-cached portion of the web page. By caching the cacheable portions of the web page 212, the browser 180 reloads the cached portion into the display 140 from the memory 172. Thus, as a result, the browser 180 only needs to retrieve the uncached non-cacheable portions from the web site 210.

Figure 2:
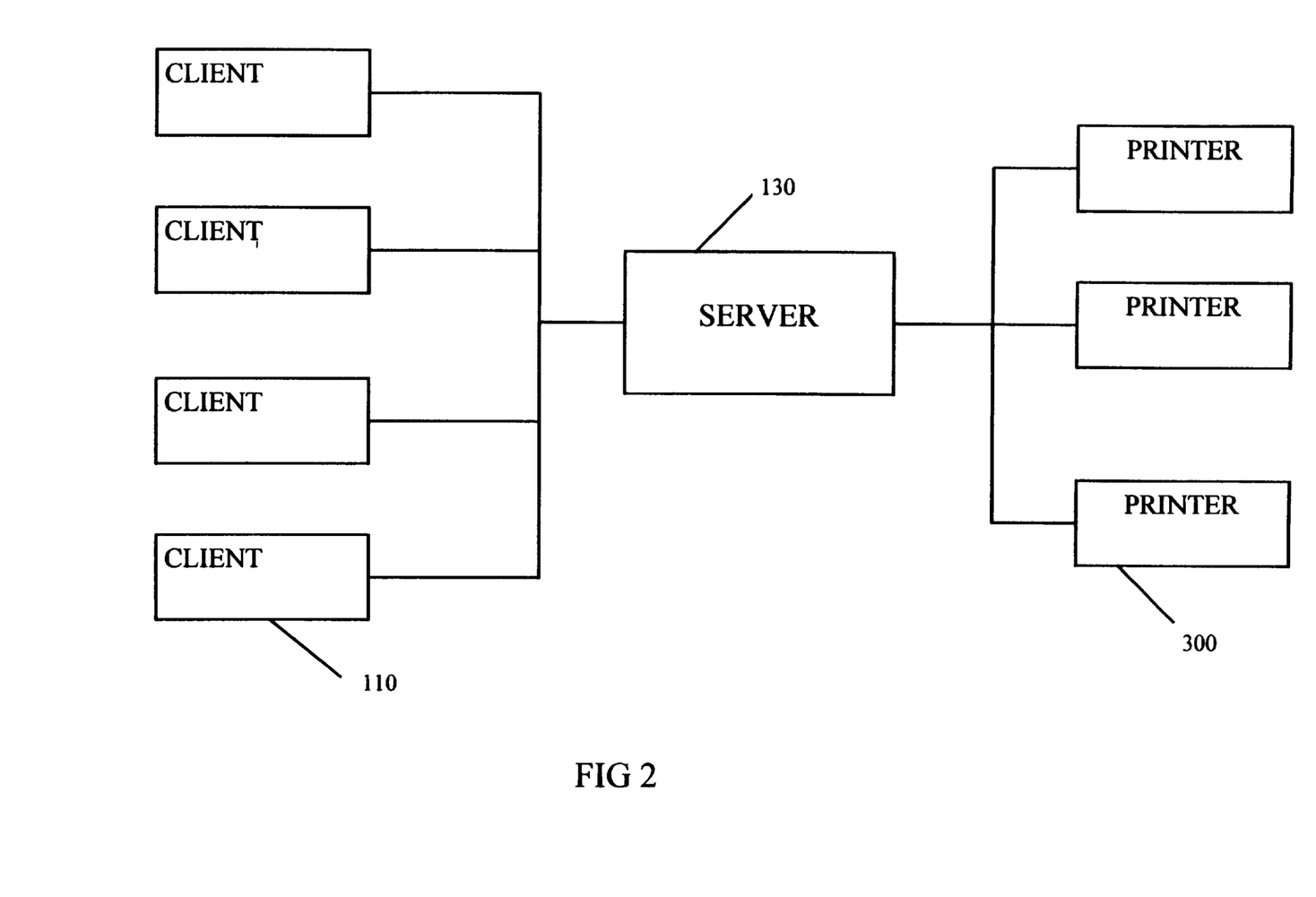
FIG. 2 is a block diagram of an embedded system for accessing web based information.

FIG. 2 depicts an embedded, or real time system. Each client 110 is connected to the server 130 and to one or more printers 300. In the case where a single printer is connected to the server, the server is typically located within the printer. When one of the printers 300 is accessed in place of one of the web sites 210, the browser 180 can be used to determine the status information of that printer 300. For example, the browser 180 can be used to retrieve page information about a particular printer 300. Information contained on the page from the printer 300 may include whether or not there is paper in the paper tray, the toner status, online/off-line status, and the like.

Figure 3:
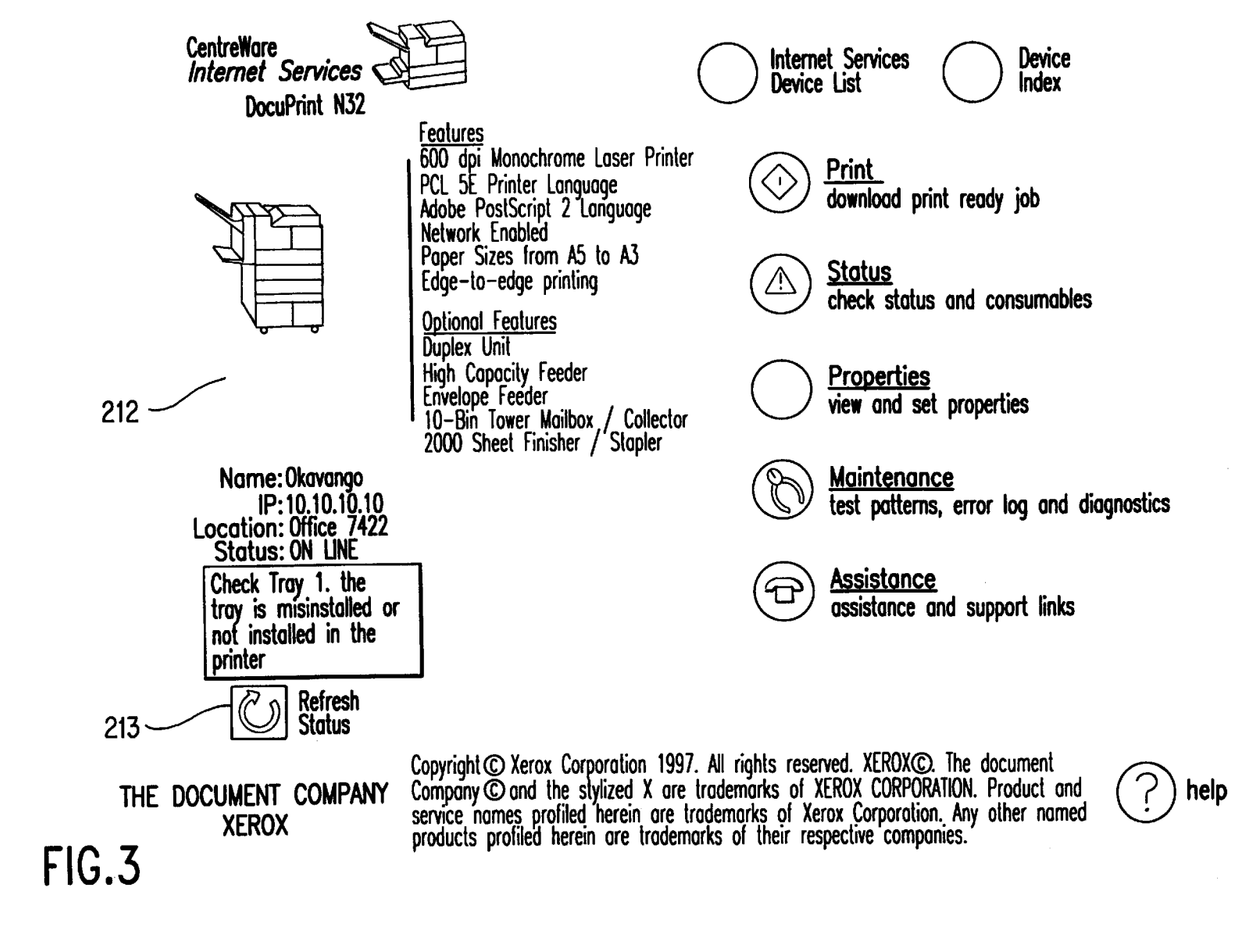
FIG. 3 is a representative web page display having a refresh button according to this invention.

FIG. 3 shows a representative page 212 retrieved from a web site and displayed by the processor 170 on the display 140. The representative page 212 shows the status of a printer 300 on a network 200. The displayed page 212 contains a refresh button 213.

When the user of the client 100 selects or clicks the refresh button 213, the browser jumps to the URL of the page and updates the non-cached portion if the non-cached portion at the URL is newer than the non-cached portion in the non-cached memory 172. For example, the non-cached portion might include the printer 300 online/offline status or whether the toner is low.

Figure 4:
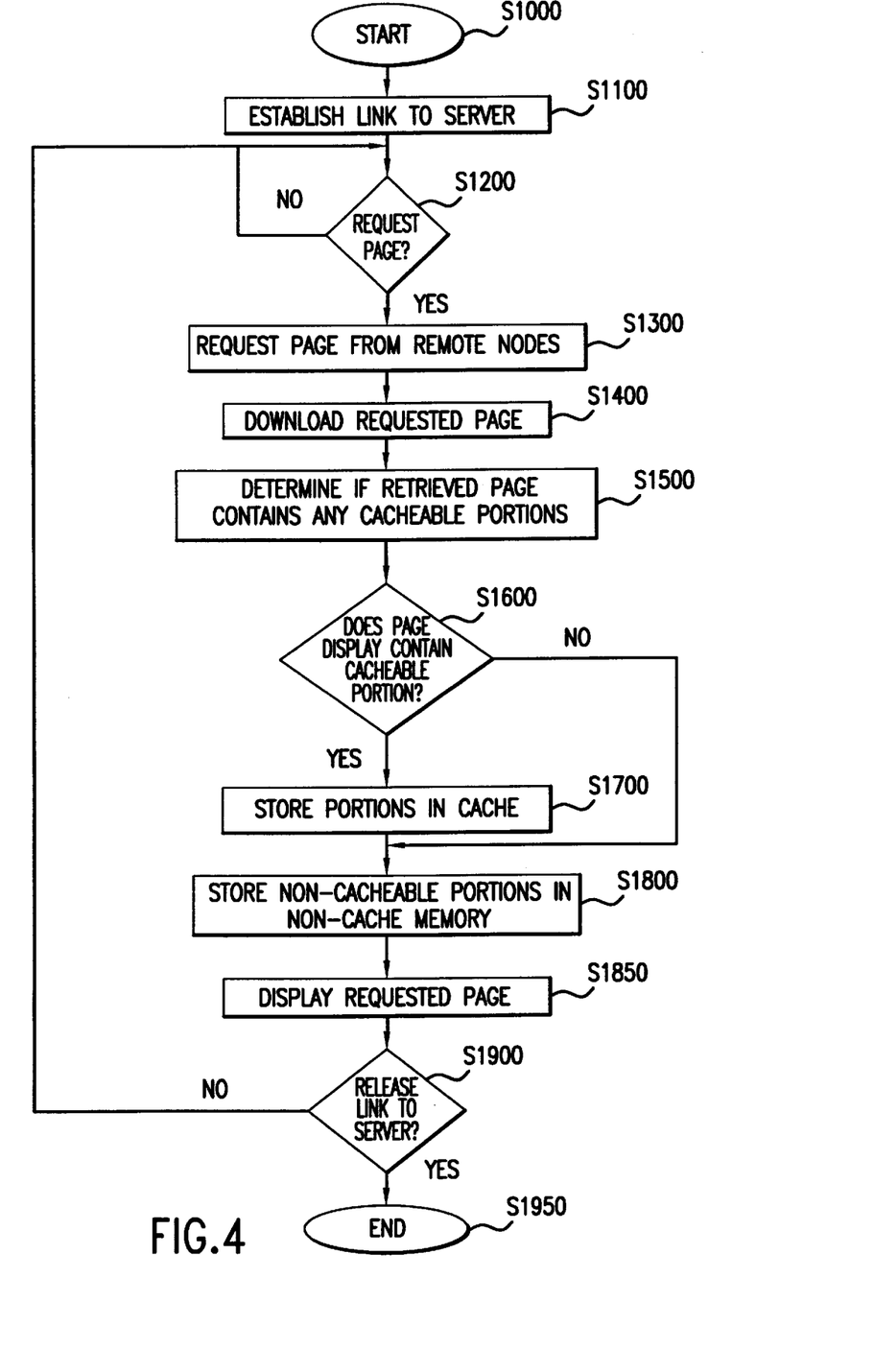
FIG. 4 is a flowchart outlining the retrieval of web pages according to this invention.

FIG. 4 outlines one preferred method for retrieving and storing web pages according to this invention. The method begins in step S1000, and continues to step S1100. In step S1100, a communications link is established between the client and the server, and continues to step S1200. In step S1200, the control system determines if a page has been requested from the server. If no page has been requested, control returns to step S1200. If a page has been requested, the process continues to step S1300. Next, in step S1300, a web page display is requested from a remote node of the distributed network. Next, in step S1400, the requested page is downloaded from the remote node.

In step S1500, the retrieved page is checked to determine if the retrieved page contains any cacheable portions. Next, in step S1600, if the page to be retrieved contains one or more cacheable portions, control continues to step S1700. Otherwise, control jumps to step S1800. In step S1700, the cacheable portions are stored in a cache. Next, in step S1800, the non-cacheable portions are stored in non-cache memory. Then, in step S1850, the requested page is displayed.

In step S1900, the control system determines if the link between the client and the server should be released. If so, control continues to step S1900, where the process ends at step S1950. Otherwise, if the link is not to be released, control returns to step S1200. Thus, in the method outlined in FIG. 4, only the cacheable portions are stored in the cache.

Figure 5:
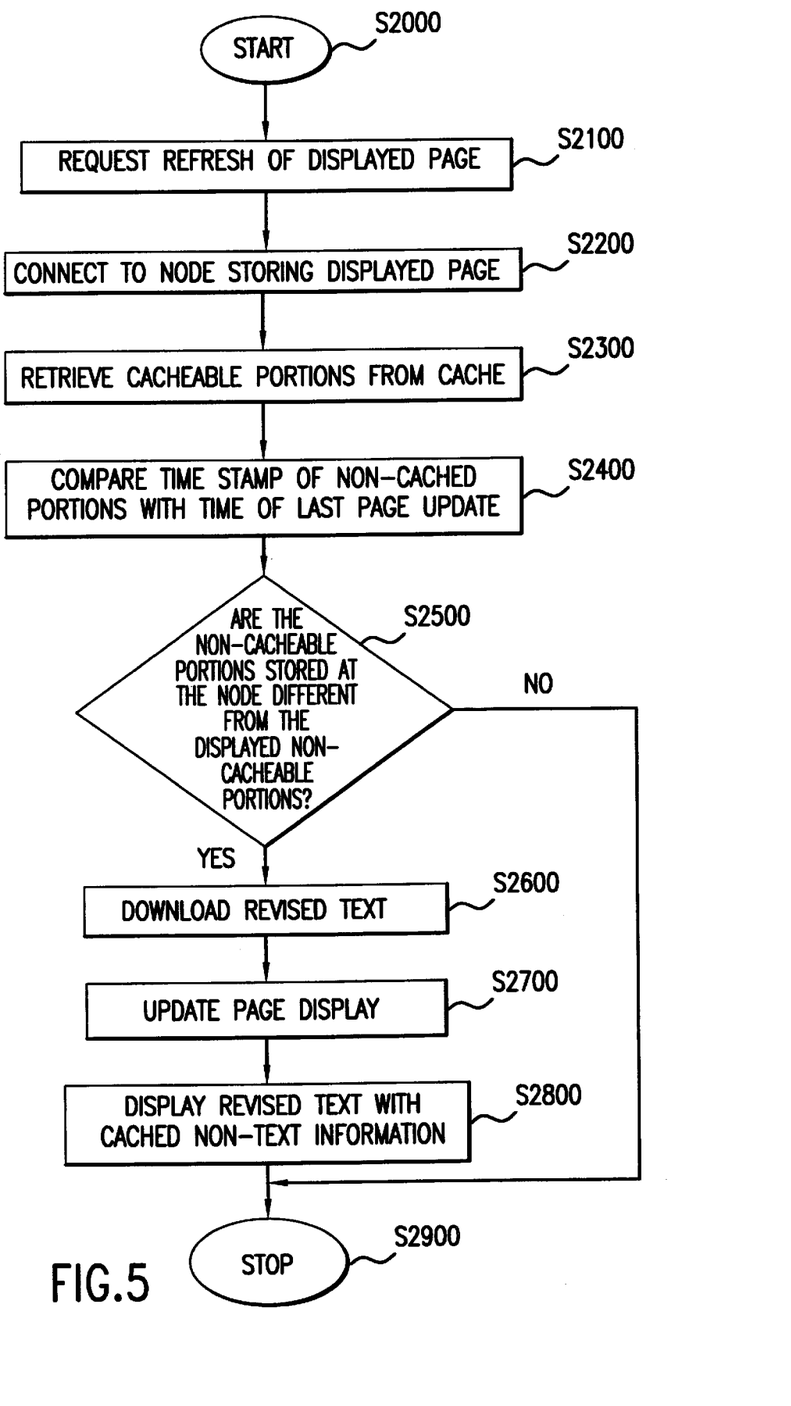
FIG. 5 is a flowchart outlining the refreshing of a web page according to this invention.

FIG. 5 outlines one preferred method for refreshing information of a web page. Beginning in step S2000, control continues to step S2100. In step S2100, a request is made to refresh the displayed page. Next, in step S2200, the client is connected to the remote node of the network storing the displayed page. Then, in step S2300, the cacheable portions are retrieved from the cache. Control then continues to step S2400.

In step S2400, the time stamp of the displayed non-cacheable portions is compared with the time stamp of the last update of the page. Then in step S2500, it is determined whether the non-cacheable portions of the page located at the remote node are different from the displayed non-cacheable portions. If the non-cacheable portions of the page stored at the remote node are different from the displayed non-cacheable portions, control continues to step S2600. Otherwise, control jumps directly to step S2900.

In step S2600, the non-cacheable portions are re-retrieved of the page from the remote node. Then, in step S2700, the displayed page is updated with the re-retrieved non-cacheable portions. Then, in step S2800, the re-retrieved non-cacheable portions are combined with the cached portions to form a complete web page. Control then continues to step S2900, where the process ends.

In another embodiment, a timer may be set within the browser to reload a web page at predetermined intervals. When this happens, the page status information in the client is compared to the page status information at the web site at the predetermined intervals.

Figure 6:
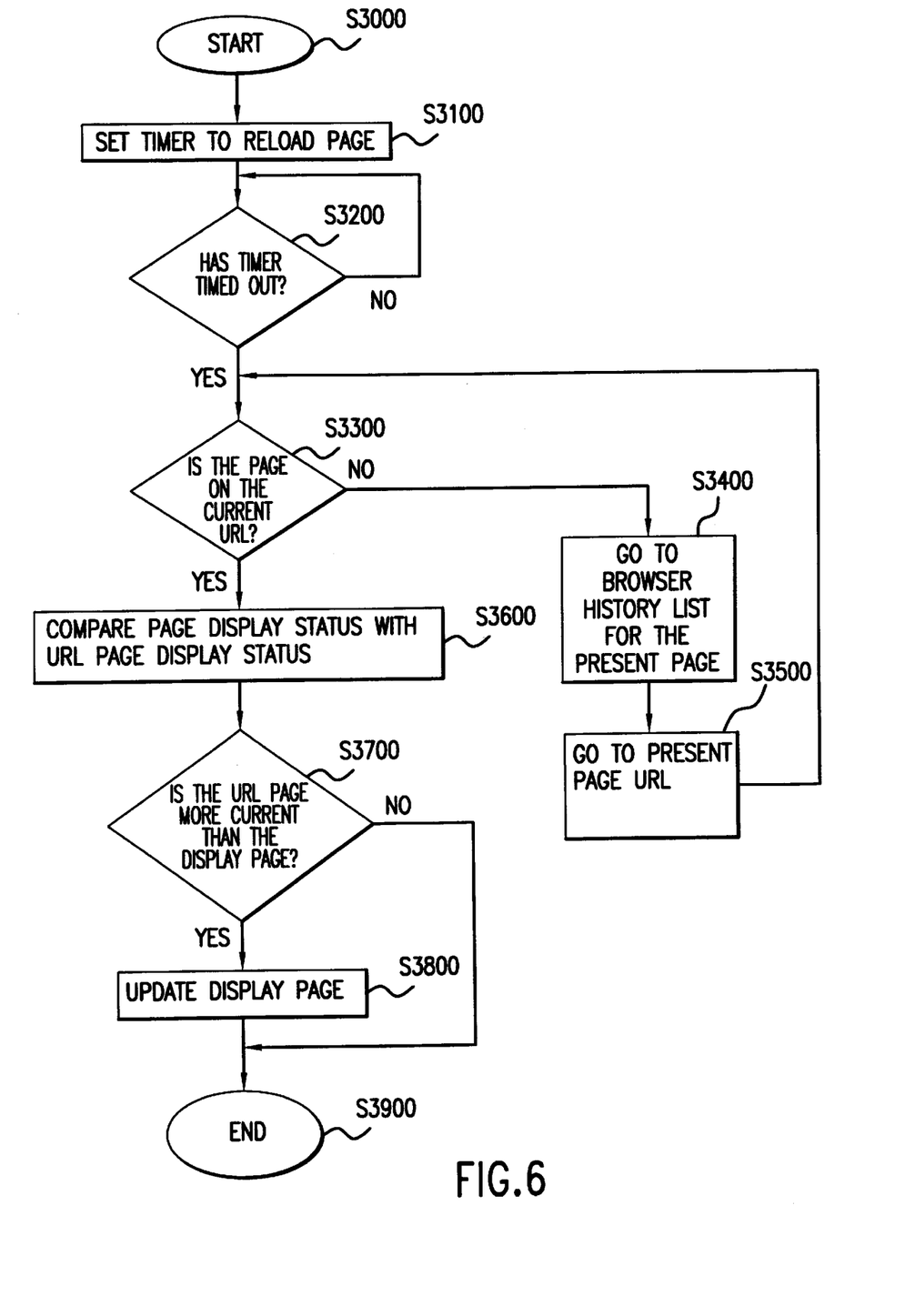
FIG. 6 is a flowchart outlining the timed reload of a web page according to this invention.

FIG. 6 outlines the timed reload embodiment of this invention. Beginning with step S3000, control continues to step S3100. In step S3100, a timer is set in the browser to reload a selected web page. Next, in step S3200, it is determined whether or not the timer has timed out. If not, control returns to step S3200. If the timer has timed out, control continues to step S3300.

In step S3300, it is next determined whether the displayed page is connected to the current URL. If the displayed page is not connected to the current URL, control continues to step S3400. Otherwise, control jumps to step S3600.

In step S3400, the browser proceeds to the history list contained in the browser for the URL of the present page. Then, in step S3500, the browser proceeds to the URL for the displayed page. Control then returns to step S3300.

In step S3600, the page display status is compared with the URL page display status. In step S3700, it is determined whether the URL page is more current than the displayed page. If the URL page is more current than the displayed page, control continues to step S3800. Otherwise, control jumps directly to step S3900. In step S3800, the displayed page is updated with the information from the URL page. Then, in step S3900, the control routine ends. In this manner, the web page on the URL is compared to the previous downloaded page from that URL, and the web page is updated periodically at the client.

While the invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for updating a document retrieved from a node of a distributed network to a client, the document having at least one cacheable portion stored in a cache memory of the client and at least one non-cacheable portion stored in a non-cache memory of the client, comprising:

issuing a request to the node to update the document;

comparing a time stamp associated with each non-cacheable portion stored at the node with a time stamp associated with the corresponding non-cacheable portion stored in the client;

retrieving each non-cacheable portion from the node that has a time stamp that is more recent than the time stamp of the corresponding non-cacheable portion stored in the client;

replacing each retrieved non-cacheable portion for the corresponding non-cacheable portion stored in the non-cache memory; and displaying the cacheable portions and the non-cacheable portions, including any retrieved non-cacheable portion.

2. A method for updating a document retrieved from a node of a distributed network to a client, the document having at least one cacheable portion stored in a cache memory of the client and at least one non-cacheable portion stored in a non-cache memory of the client, comprising:

issuing a request to the node to update the document;

comparing each non-cacheable portion stored at the node with the corresponding non-cacheable portion stored in the client;

retrieving each non-cacheable portion from the node that is different from the corresponding non-cacheable portion stored in the client;

replacing each retrieved non-cacheable portion for the corresponding non-cacheable portion stored in the non-cache memory; and displaying the cacheable portions and the non-cacheable portions, including any retrieved non-cacheable portion.

3. An apparatus that updates a document retrieved from a node of a distributed network to a client, comprising:

a browser that retrieves the document from the node over the distributed network and separates the document into at least one cacheable portion and at least one non-cacheable portion, the at least one cacheable portion stored in cache memory of the client and the at least one non-cacheable portion stored in non-cache memory of the client, the browser comprising:

a refresh status button that compares each at least one non-cacheable portion of the document stored in the non-cache memory with a corresponding non-cacheable portion of the document stored at the node;

wherein, for each non-cacheable portion of the document stored in the non-cache memory that is different from the corresponding non-cacheable portion of the document stored at the node, the browser retrieves the corresponding non-cacheable portion of the document stored at the node and stores the retrieved non-cacheable portion in the non-cache memory in place of the corresponding non-cacheable portion previously stored in the non-cacheable memory.

4. The apparatus of claim 3, wherein the browser displays the at least one cacheable portion stored in the cache memory and the at least one non-cacheable portion stored in the non-cache client memory, including any retrieved corresponding non-cacheable portion.

* * * * *